(12) United States Patent
Digmann et al.

(10) Patent No.: US 8,915,029 B2
(45) Date of Patent: Dec. 23, 2014

(54) FACE PANELS FOR LOADING DOCK SEALS AND SHELTERS

(75) Inventors: Charles Digmann, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 30 days.

(21) Appl. No.: 13/404,962

(22) Filed: Feb. 24, 2012

(65) Prior Publication Data

US 2013/0221624 A1 Aug. 29, 2013

(51) Int. Cl.
*E04D 13/18* (2014.01)
*E04H 14/00* (2006.01)

(52) U.S. Cl.
USPC ............................... 52/173.2; 52/2.12

(58) Field of Classification Search
USPC ...................... 52/2.12, 173.2; 49/9
See application file for complete search history.

(56) References Cited

U.S. PATENT DOCUMENTS

| | | | |
|---|---|---|---|
| 3,403,489 | A | 10/1968 | Frommelt et al. |
| 3,653,173 | A | 4/1972 | Frommelt et al. |
| 3,939,614 | A * | 2/1976 | Frommelt et al. ............ 52/2.13 |
| 4,805,362 | A | 2/1989 | Frommelt et al. |
| 5,185,977 | A | 2/1993 | Brockman et al. |
| 5,394,662 | A | 3/1995 | Giuliani et al. |
| 5,622,016 | A | 4/1997 | Frommelt et al. |
| 5,953,868 | A | 9/1999 | Giuliani et al. |
| 6,948,285 | B2 | 9/2005 | Miller et al. |
| 8,112,948 | B2 | 2/2012 | Desjardins |
| 2002/0110423 | A1 * | 8/2002 | Miller et al. .................. 405/110 |
| 2004/0020141 | A1 * | 2/2004 | Borgerding .................. 52/173.2 |
| 2004/0134139 | A1 * | 7/2004 | Busch et al. ................. 52/173.2 |
| 2004/0163326 | A1 * | 8/2004 | Miller et al. .................. 52/2.12 |
| 2006/0026912 | A1 | 2/2006 | Eungard et al. |
| 2006/0032159 | A1 | 2/2006 | Eungard et al. |
| 2006/0090407 | A1 | 5/2006 | Hoffmann et al. |
| 2007/0283636 | A1 * | 12/2007 | Bernacki et al. ............ 52/173.2 |
| 2008/0302029 | A1 * | 12/2008 | Desjardins .................. 52/173.2 |
| 2010/0251639 | A1 | 10/2010 | Hoffmann et al. |

FOREIGN PATENT DOCUMENTS

| | | |
|---|---|---|
| EP | 1457443 A1 | 9/2004 |
| WO | 8102604 | 9/1981 |

OTHER PUBLICATIONS

International Searching Authority, "Search Report" issued in connection with International Patent Application No. PCT/US2013/026664, mailed on Jun. 12, 2013, 6 pages.

International Searching Authority, "Written Opinion" issued in connection with International Patent Application No. PCT/US2013/026664, mailed on Jun. 12, 2013, 4 pages.

International Bureau, "International Preliminary Report on Patentability," issued in connection with International Application No. PCT/US2013/026664, on Aug. 26, 2014, 5 pages.

European Patent Office, "Communication Pursuant to Rules 161(1) and 162 EPC," issued in connection with European Patent Application No. 13707983.6-1708, mailed on Oct. 1, 2014. (2 pages).

* cited by examiner

*Primary Examiner* — Brian Glessner
*Assistant Examiner* — Brian D Mattei
(74) *Attorney, Agent, or Firm* — Hanley, Flight & Zimmerman, LLC

(57) ABSTRACT

Example flexible face panels for dock shelters and dock seals at a loading dock include a tip seal and/or an air-filled blister or elongate "bubble" that sealingly conforms to a rear portion of a vehicle (e.g., truck, trailer, etc.) at the dock. In some examples, an air chamber within the blister is open at one or both ends. This prevents otherwise trapped pressurized air from adversely affecting the blister's compliance or its ability to sealingly conform to irregular surfaces of the vehicle. In some examples, as the vehicle backs into and deflects the face panel, the blister distorts and wraps itself around the vehicle's surface irregularities, such as door hardware and protruding lights. In some examples, the face panel's tip seal includes an overlapping seal flap, wherein a series of slits in the tip seal allow the seal to fit over the vehicle's various surface irregularities.

30 Claims, 15 Drawing Sheets

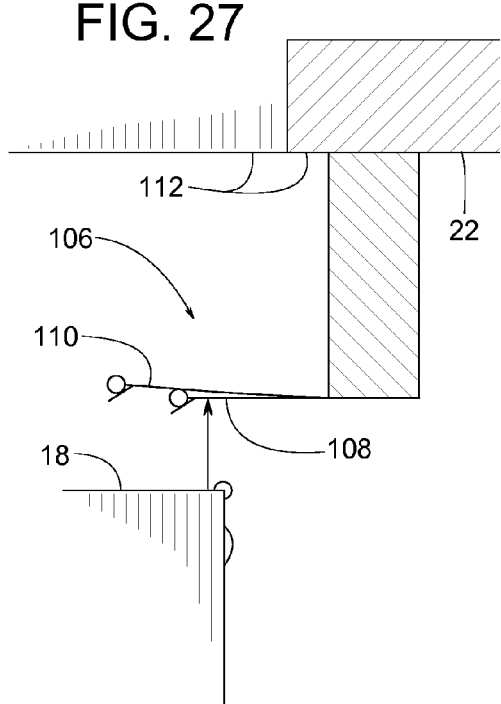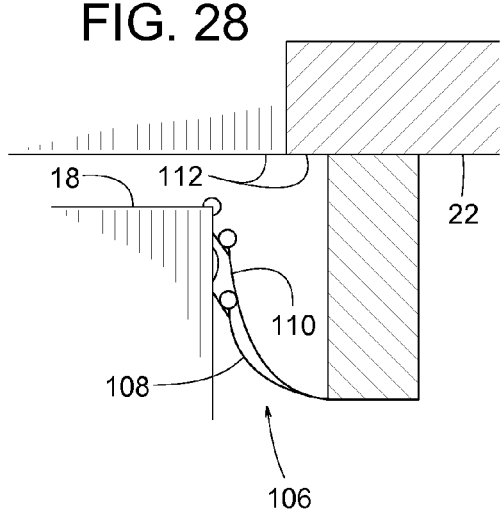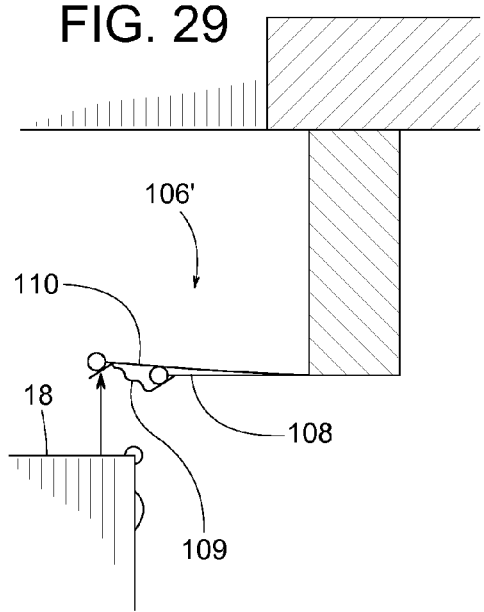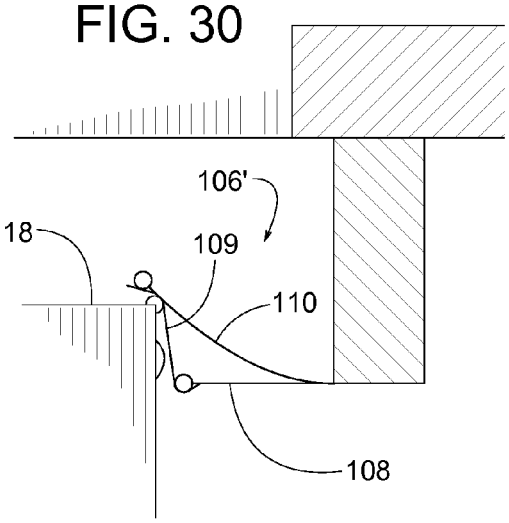

FIG. 31
FIG. 32
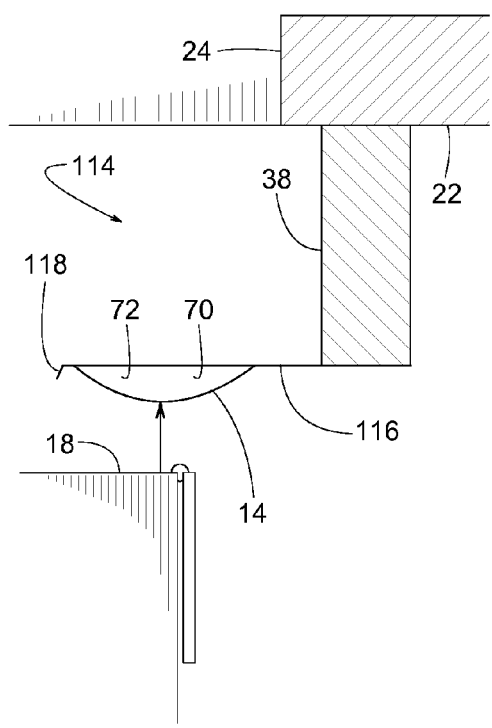
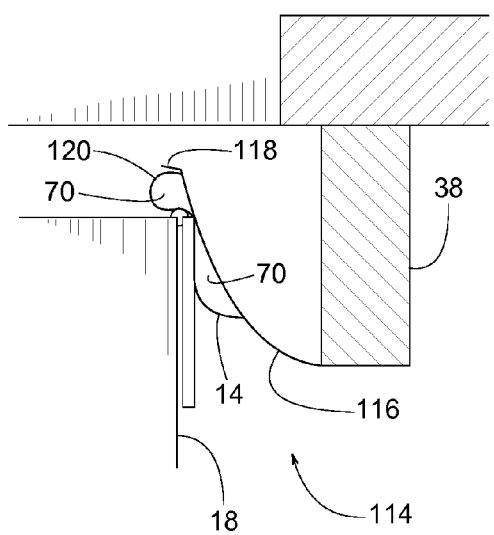

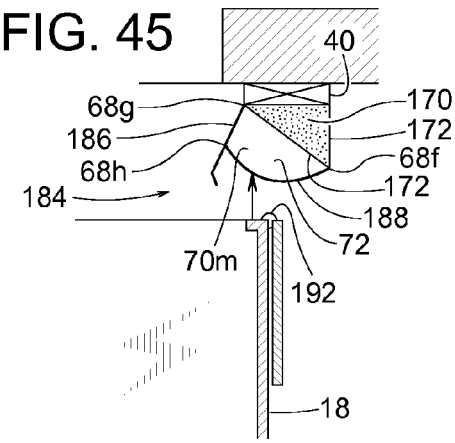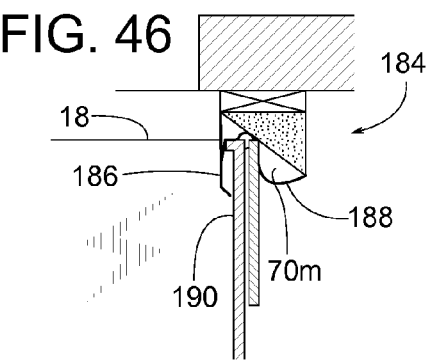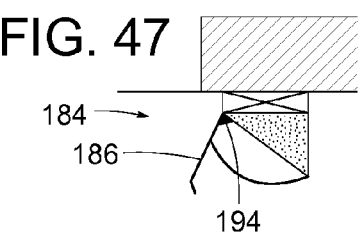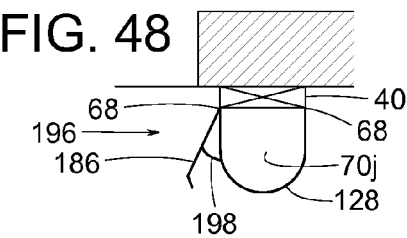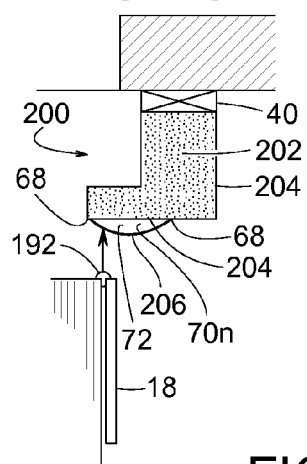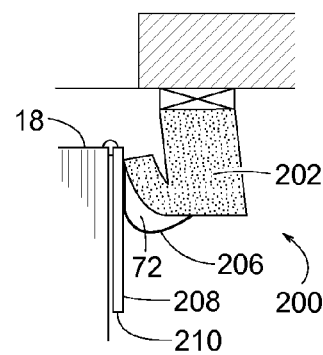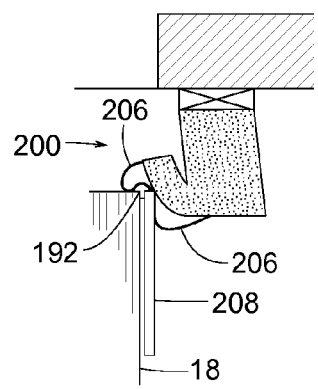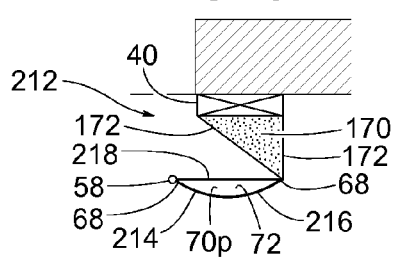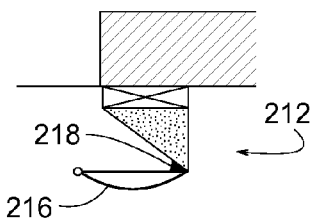

FACE PANELS FOR LOADING DOCK SEALS AND SHELTERS

FIELD OF THE DISCLOSURE

This patent generally pertains to loading dock seals and dock shelters for vehicles and, more specifically, to face panels for dock seals and shelters.

BACKGROUND

In general, dock seals and shelters prevent the ingress of outdoor environmental conditions or contaminants (e.g., rain, snow, wind, hot/cold temperatures, insects, animals, etc.) into the interior of a building (e.g., the dock area) and/or cargo area of a vehicle during the loading or unloading of the vehicle. Dock shelters and seals may also prevent the egress of conditioned air from within a building and/or a vehicle cargo area to the outdoor environment. In some instances, vehicles (e.g., the trailer or rear portion of a truck) may not be sufficiently centered relative to dock seals or shelters when backed into the seal or shelter to isolate the interior space of a building and adjacent vehicle cargo area from the outdoor environment. As a result, some dock seals and shelters compensate for some range of off-center vehicle positions within which the functionality of the seal or shelter is not compromised. Further, some structures of a seal or shelter, particularly side members, are capable of recovering from repeated impacts from the rear portions of off-center vehicles without sustaining substantial permanent deformation.

BRIEF DESCRIPTION OF THE DRAWINGS

FIG. 27 is a cross-sectional view similar to FIG. 24, but showing another vehicle approaching the seal assembly of FIG. 24.

FIG. 28 is a cross-sectional view similar to FIG. 26, but showing the example seal assembly of FIG. 24 in a third deflected position.

FIG. 29 is a cross-sectional view similar to FIG. 23, but showing another example seal assembly disclosed herein.

FIG. 30 is a cross-sectional view similar to FIG. 25, but showing the example seal assembly of FIG. 29 in a deflected position.

FIG. 31 is a cross-sectional view similar to FIG. 3, but showing another example seal assembly disclosed herein.

FIG. 32 is a cross-sectional view similar to FIG. 31, but showing the example seal assembly of FIG. 31 sealed against a vehicle.

FIG. 45 is a cross-sectional top view similar to FIG. 33, but showing another example seal assembly disclosed herein.

FIG. 46 is a cross-sectional top view similar to FIG. 45, but showing a vehicle engaging the example seal assembly of FIG. 45.

FIG. 47 is a cross-sectional top view similar to FIG. 45, but showing the example seal assembly of FIG. 45 having a stiffener.

FIG. 48 is a cross-sectional top view similar to FIG. 33, but showing another example seal assembly disclosed herein.

FIG. 49 is a cross-sectional top view similar to FIG. 33, but showing another example seal assembly disclosed herein with a vehicle approaching it.

FIG. 50 is a cross-sectional top view similar to FIG. 49, but showing the example seal assembly of FIG. 48 deflected by a vehicle.

FIG. 51 is a cross-sectional top view similar to FIG. 49, but showing the example seal assembly of FIG. 49 in another deflected position.

FIG. 52 is a cross-sectional top view similar to FIG. 33, but showing another example seal assembly disclosed herein.

FIG. 53 is a cross-sectional top view similar to FIG. 52, but showing the example seal assembly of FIG. 52 having an added stiffener.

DETAILED DESCRIPTION

Figure 1:
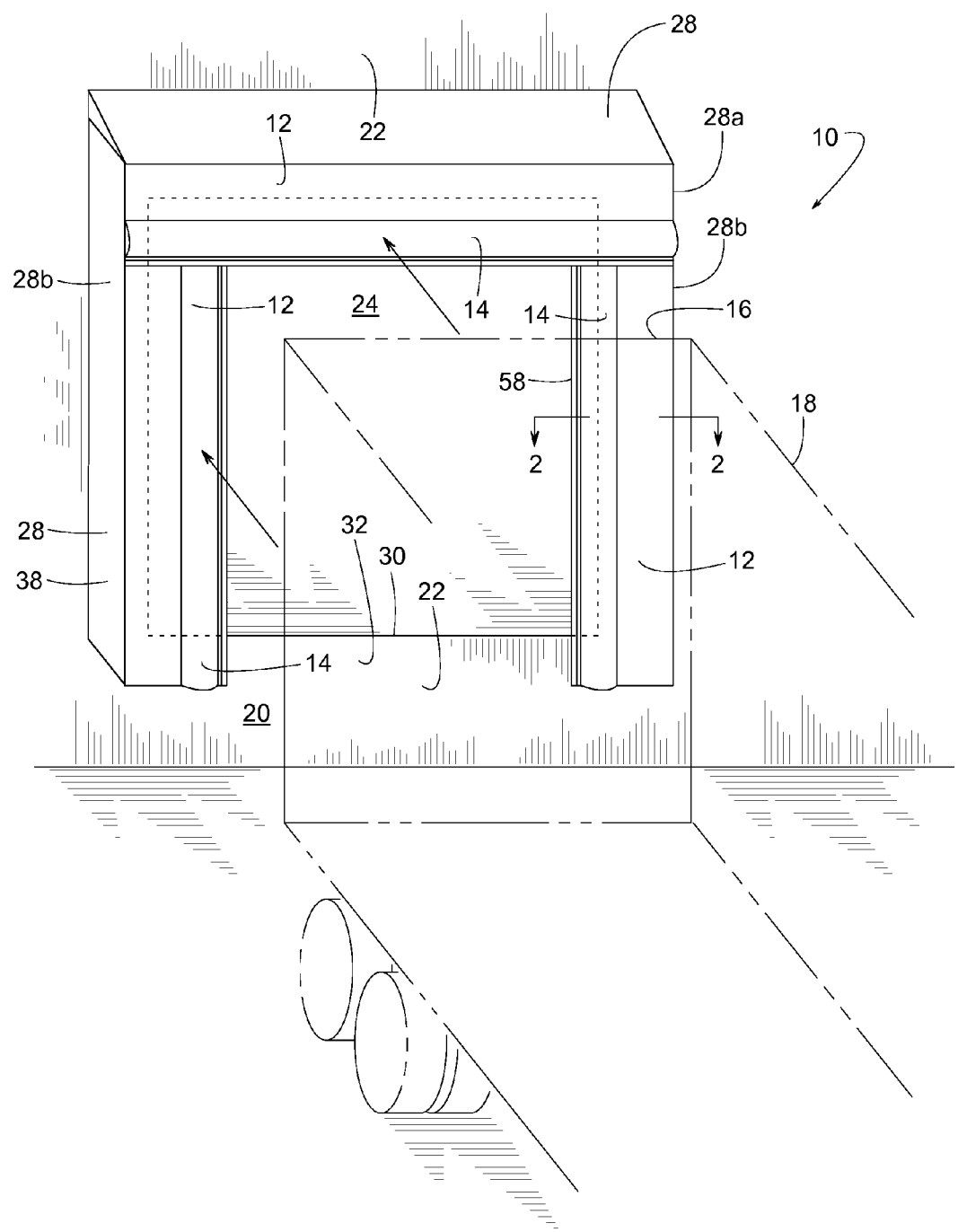
FIG. 1 is a perspective view of an example dock shelter incorporating an example seal assembly in accordance with the teachings of this disclosure.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members, which are often referred to as side curtains, extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

Dock shelters typically provide unobstructed access to a vehicle cargo area opening. However, known dock shelter side members may be constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

Some dock shelters have impactable side members. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

FIGS. 1-53 illustrate example loading dock seal assemblies 10 (e.g., dock seals, dock shelters and combinations thereof) and various portions, features and variations thereof in accordance with the teachings of this disclosure. Some examples of seal assembly 10 include tip seals (FIGS. 14-22) and/or a face panel 12 with a fluid or air-filled blister 14 or "bubble" for sealingly conforming to a rear portion 16 of a vehicle 18 (e.g., a truck, a trailer, etc.) at a loading dock 20. Dock 20 may include, for example, a building wall 22 with a doorway 24 for transferring cargo to and from vehicle 18. To facilitate loading and unloading operations, some examples of dock 20 may include, for example, a dock leveler 26 (FIG. 2), bumpers, a vehicle restraint, etc.

Figure 2:
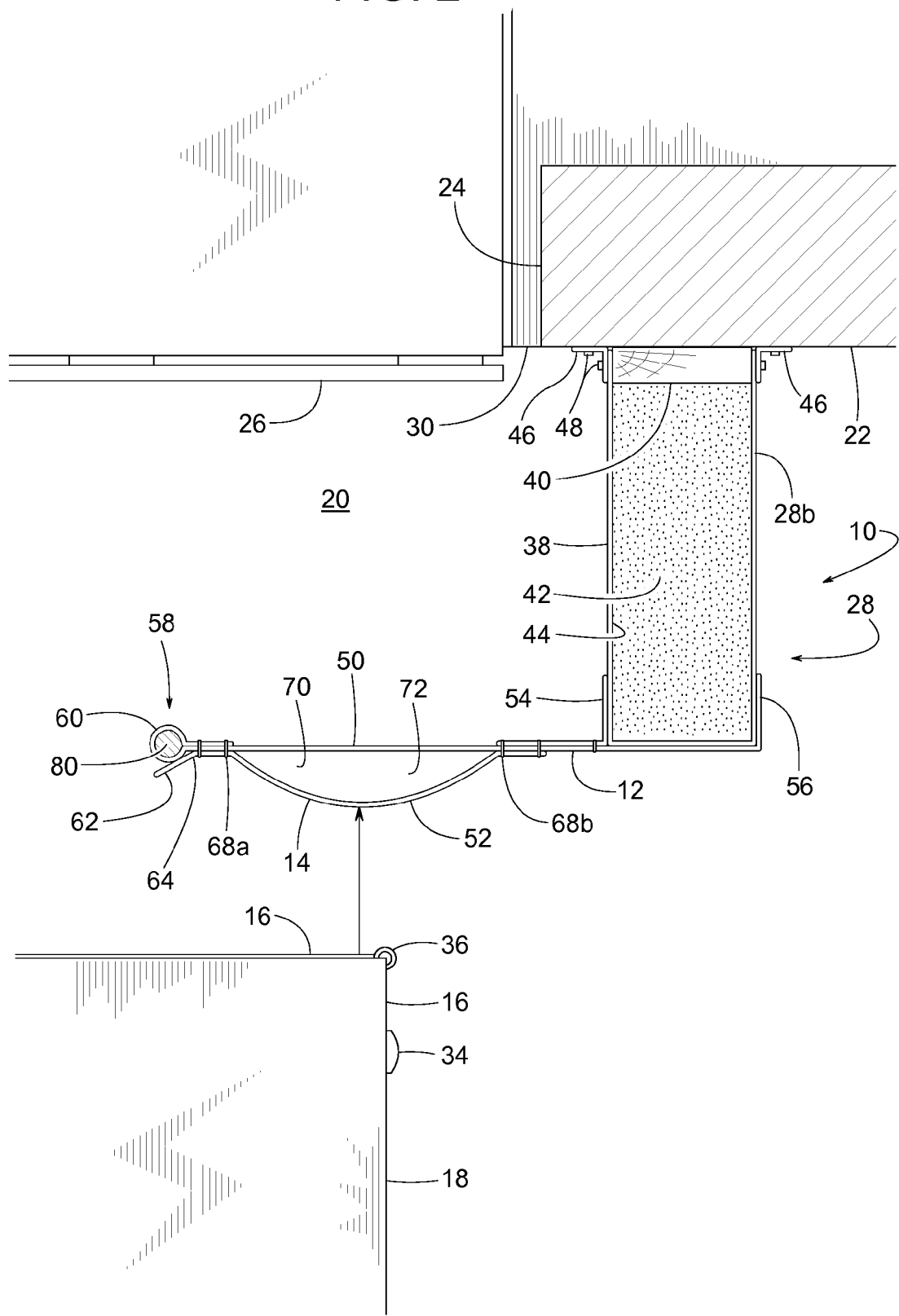
FIG. 2 is a cross-sectional view taken along line 2-2 of FIG. 1.
Figure 3:
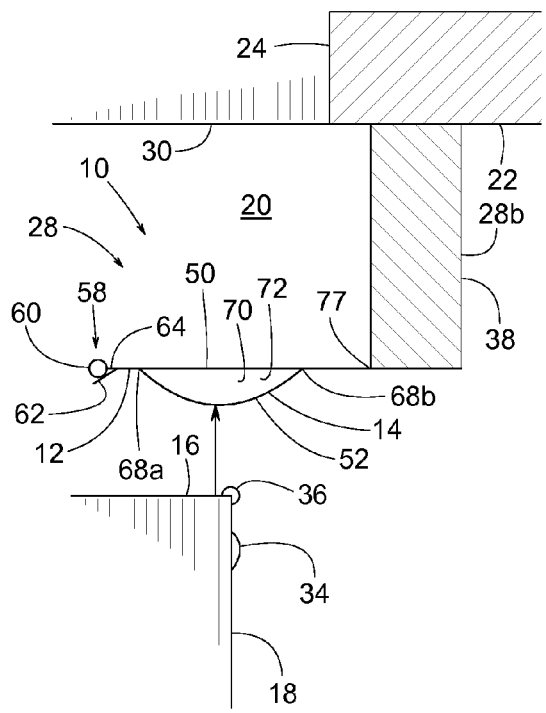
FIG. 3 is a cross-sectional view similar to FIG. 2 showing a vehicle approaching the example seal assembly with a face panel of the seal assembly in a standby position.
Figure 4:
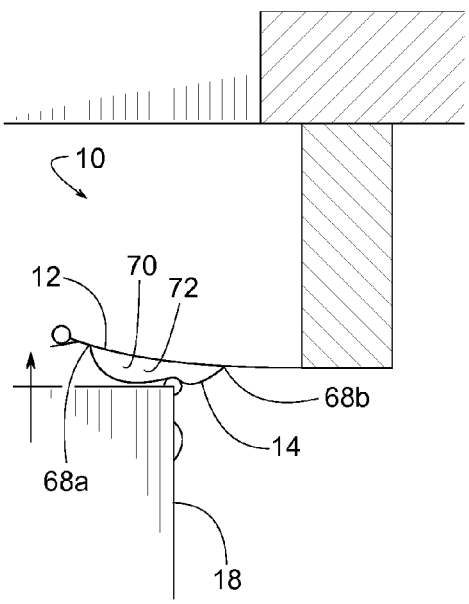
FIG. 4 is a cross-sectional view similar to FIG. 3, but showing the example face panel of FIG. 3 in a deflected position.
Figure 5:
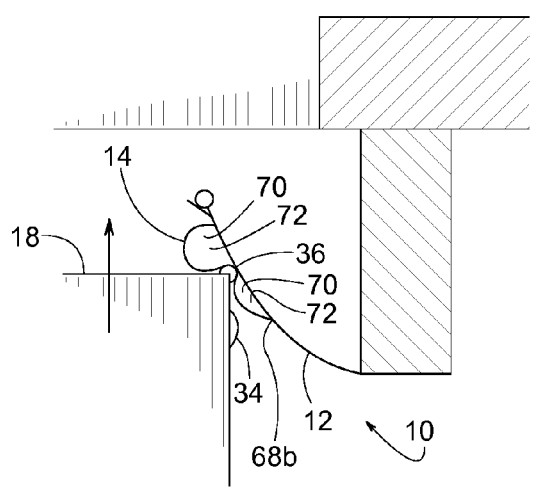
FIG. 5 is a cross-sectional view similar to FIG. 3, but showing the example face panel in another deflected position.
Figure 6:
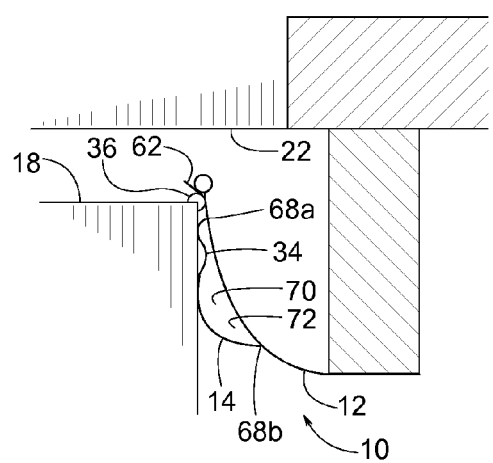
FIG. 6 is a cross-sectional view similar to FIG. 3, but showing the example face panel in yet another deflected position.

Seal assembly 10 of the illustrated example may be employed with a dock shelter 28 or dock seal to help seal out weather from the vehicle's rear portion 16 as vehicle 18 is being loaded or unloaded of its cargo. FIGS. 1-3 show vehicle 18 backing toward dock shelter 28, and FIGS. 4, 5 and 6 show the progression of vehicle 18 backing into shelter 28 (e.g., engaging shelter 28). Vehicle 18 stops, for example, when the vehicle's rear portion 16 is sufficiently close to the doorway's lower edge 30 to allow cargo to be readily transferred between a building 32 and vehicle 18. Sometimes a bumper mounted to wall 22 is used for establishing the vehicle's proper stopping position.

To help seal and/or shelter the upper and lateral edges of the vehicle's rear portion 16, dock shelter 28 of the illustrated example includes a header 28a and two side members 28b. In some examples, side members 28b and/or header 28a include seal assembly 10, which can sealingly conform to the vehicle's rear portion 16 and various irregularities of rear portion 16, such as, for example, a light 34 (e.g., a tail light, a side running light, a reflector, etc.), a piece of door hardware 36 (e.g., a hinge, a hinged edge of a rear door, a door frame) etc. The following description of seal assembly 10 is with reference to seal assembly 10 being used as side member 28b. However, additionally or alternatively, an identical or similar seal assembly 10 can be used as header 28a.

Referring further to FIG. 2, seal assembly 10 of the illustrated example has face panel 12 extending from a projection panel 38 that is attached to wall 22 in proximity with doorway 24. In some examples (but certainly not all), projection panel 38 includes a backer 40 (e.g., a plank) and a resiliently compressible foam core 42 (e.g., polyurethane foam) encased within a pliable protective cover 44 (e.g., chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.). For example, angle iron brackets 46 with screws 48 fastened to backer 40 and wall 22 may be employed to mount projection panel 38 to wall 22. The core's resilience enables projection panel 38 to withstand an accidental impact from vehicle 18.

Some examples of face panel 12 include a back sheet 50, a front sheet 52 and flanges 54 and 56. In some examples, sheets 50 and 52 are individual pieces, and in other examples, sheets 50 and 52 are a single piece folded onto itself to form both sheets 50 and 52. In some examples, as shown in FIGS. 2-7 and 10, a tip seal 58 with an elongate casing 60 and a seal flap 62 is positioned or runs along at least a portion of a length of a distal edge 64 of face panel 12. As shown, distal edge 64, tip seal 58 and seal flap 62 extend along a primary length 66 of face panel 12. Casing 60 is positioned or interposed between at least a portion of seal flap 62 and doorway 24 when face panel 12 is in a standby position (e.g., FIG. 2). A suitable fastener couples or connects flanges 54 and 56 to projection panel 38. An example fastener may include, but is not limited to, a touch-and-hold fastener (e.g., VELCRO—trademark of Velcro Industries of Manchester, N.H.), one or more buttons, snaps, zipper, threads, laces, adhesive welded interfaces, and/or any other suitable fastener(s). Example materials of sheets 50 and 52, flanges 54 and 56, casing 60, and seal flap 62 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.

To provide face panel 12 with sufficient compliance to sealingly conform to various and sometimes irregular features of the vehicle's rear portion 16, some examples of face panel 12 include a first seam 68a and a second seam 68b positioned adjacent to where front sheet 52 adjoins back sheet 50. More specifically, front sheet 52, in the area between seams 68a and 68b, is materially wider (e.g., has a longer length) than back sheet 50 between seams 68a and 68b to enable front sheet 52 to bulge outward away from back sheet 50. Additional seams 68c, 68d and 68e can help couple or connect other face panel parts, such as casing 60, seal flap 62, and flanges 54 and 56. The term, "seam" means a line of contact (or equivalent thereof, e.g., an effective line of contact such as a dotted line or an interface of indirect contact) between adjoining surfaces or abutting edges, where the adjoining surfaces or abutting edges are not necessarily connected. In some examples, however, the adjoining surfaces or abutting edges are connected at the seam. In some examples, the seam is a continuous or intermittent elongate joint (e.g., a generally linear joint) that may or may not include an additional intermediate joining piece (e.g., an intermediate piece such as double-sided tape for bonding one sheet to another). Examples of seams 68 (e.g., seams 68a-h) include, but are not limited to, one or more strings of thread providing a sewn connection, a series of rivets, a series of snaps, a welded joint, a zippered joint, a hook-and-loop fastener (e.g., VELCRO connecting sheets 50 and 52, wherein VELCRO is a registered trademark of Velcro USA Inc., of Manchester, N.H.), double-sided tape, an adhesive joining two pieces, a front sheet adjoining but unconnected to a back sheet, a front sheet adjoining a foam core, a front sheet adjoining a backer, etc.

The bulging of front sheet 52 relative to back sheet 50 forms blister 14. Blister 14 provides or defines an elongate chamber 70 containing a variable volume of fluid or air 72 between sheets 52 and 50. Chamber 70 is substantially vertically elongate when face panel 12 is part of side member 28b and is substantially horizontally elongate when part of header 28a. In various examples, elongate chamber 70 is open at one end, open at both opposite ends, and/or open at intermediate points between the opposite ends to place the volume of air 72 in open fluid communication with surrounding ambient air outside of seal assembly 10. With chamber 70 being open at each opposite end, for example, uppermost and lowermost ends of chamber 70 are open (e.g., in fluid communication with the ambient air) when chamber 70 is oriented vertically (e.g., substantially vertically) (e.g., when the seal assembly 10 is employed in the example of side members 28b). Chamber 70 being open to ambient air maintains the air in chamber 70 at atmospheric pressure, and thus prevents otherwise possible internal positive air pressure from hindering the flexibility and/or normal compliance of blister 14.

The compliance and sealing effectiveness of the blister 14 is illustrated in FIGS. 3-6. As vehicle 18 first engages face panel 12 upon vehicle 18 moving from its standby position of FIG. 3 to a deflected position of FIG. 4, blister 14 conforms to, for example, door hardware 36 and/or other features and/or surfaces of the vehicle's rear portion 16. As vehicle 18 deflects face panel 12 from a standby position (e.g., FIG. 2) to a deflected position (e.g., FIG. 4), blister 14 distorts such that the variable volume of air 72 shifts between second seam 68*b* and first seam 68*a*. For example, air 72 may shift from second seam 68*b* toward first seam 68*a*, thereby reducing the volume of air 72 immediately adjacent to second seam 68*b* and increasing the volume of air 72 immediately adjacent to first seam 68*a*. Some volume of air 72 may flow through or across one of the open ends of blister 14.

As vehicle 18 moves further back into dock shelter 28 from the face panel's deflected position of FIG. 4 to another or further deflected position of FIG. 5, the air 72 continues to shift and/or displace between seams 68*a* and 68*b*. From the deflected position of FIG. 5, continued movement of vehicle 18 toward wall 22, as shown in FIG. 6, causes air 72 to shift forward from seam 68*a* to seam 68*b*, which allows blister 14 to continue and/or further conform against the vehicle's rear portion 16 to provide a seal between vehicle 18 and seal assembly 10. FIG. 6 also shows that in some cases a deflected position of face panel 12 also positions or places tip seal 58 (e.g., seal flap 62) in sealing engagement with vehicle 18. As air 72 shifts between seams 68*a* and 68*b*, some air 72 may enter or leave chamber 70 through one or more of the chamber's open ends.

Figure 7:
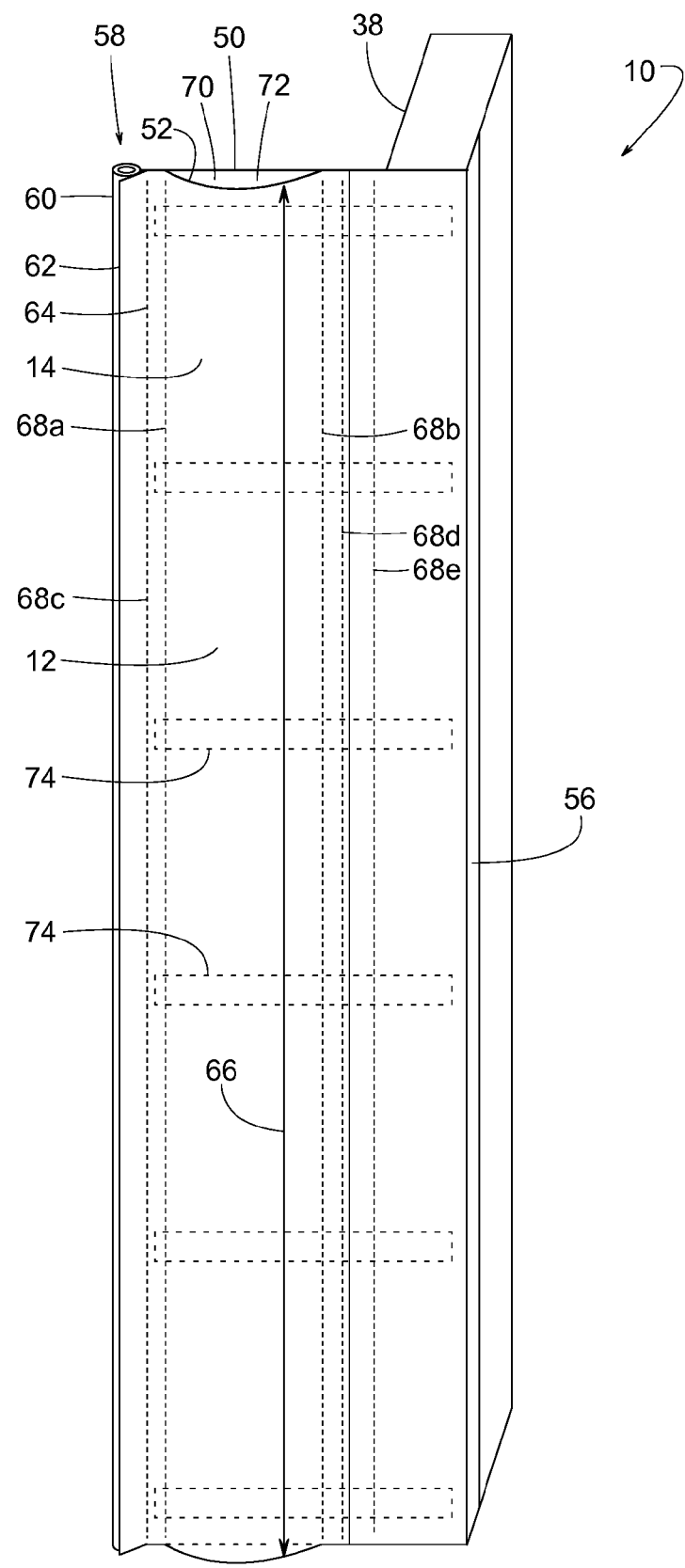
FIG. 7 is a perspective view of the example seal assembly shown in FIGS. 2-6.
Figure 8:
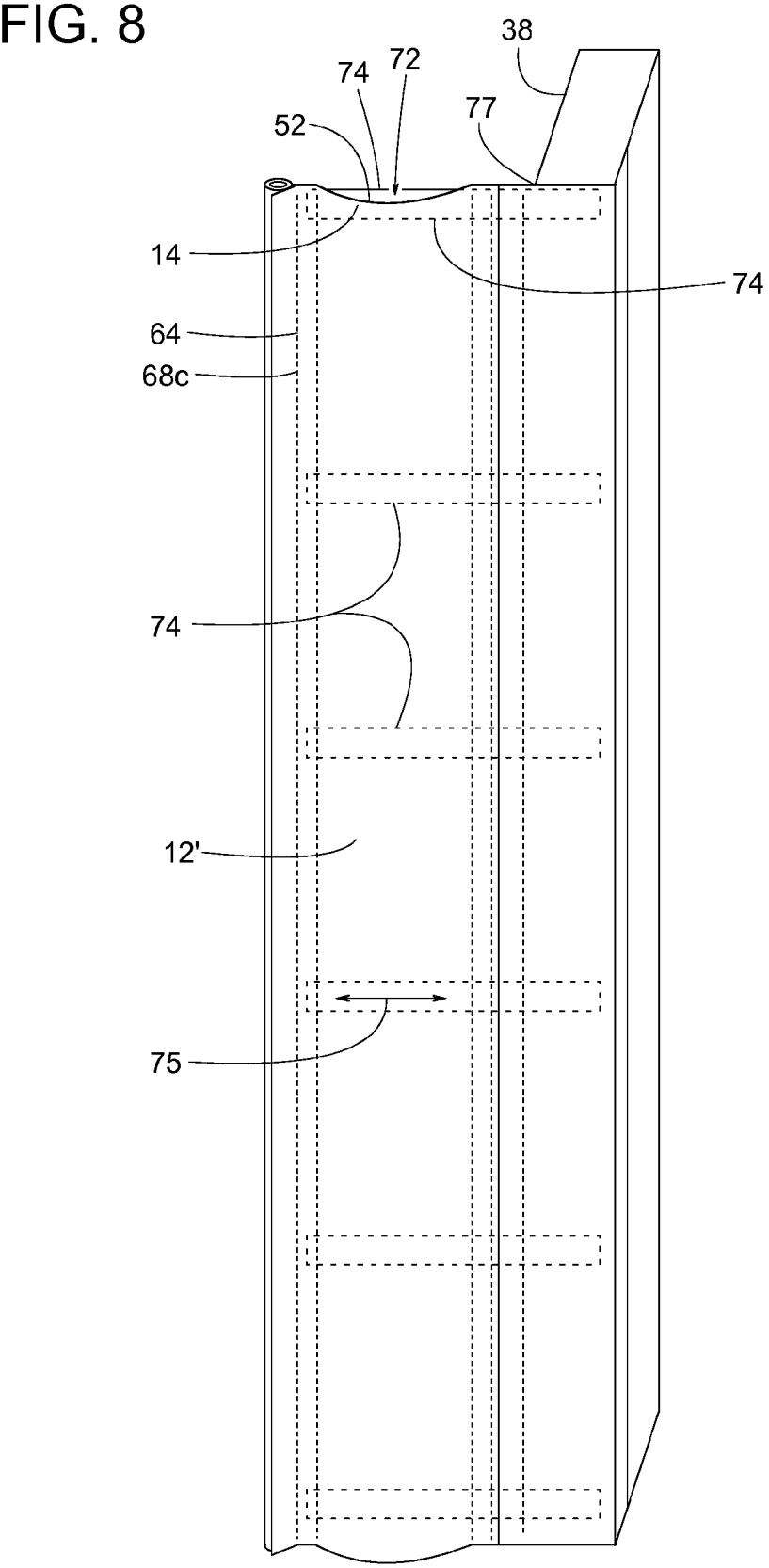
FIG. 8 is a perspective view similar to FIG. 7, but showing another example seal assembly disclosed herein.

Some examples of seal assembly 10, as shown in FIGS. 7 and 8, include a plurality of ribs or stays 74 for providing additional stiffness or resilience to face panel 12 (FIG. 7) or a face panel 12' (FIG. 8). For example, referring to FIG. 8, stays 74 are elongate in a longitudinal direction 75 and extend in direction 75 from a point of attachment 77 toward distal edge 64. Point of attachment 77 may be, for example, where face panel 12' adjoins projection panel 38, any position between flanges 54 and 56, etc. Examples of point of attachment 77 include, but are not limited to, a single point, a plurality of points, a continuous line, an intermittent line, a planar surface, etc. In some examples, to make stays 74 stiffer than front sheet 52, stays 74 are made of fiberglass strips about 0.125 inches thick, 1.5 inches wide and about 2 to 3 feet long. In the example shown in FIG. 8, stays 74 hold front sheet 52 in a bowed shape without assistance from any back sheet, thus back sheet 50 is omitted. Sheet 52 bowing away from stays 74 creates blister 14, which contains or defines variable volume of air 72 between front sheet 52 and stays 74. In some cases, air 72 shifts between distal edge 64 and point of attachment 77 in reaction to vehicle 18 deflecting face panel 12' from a standby position (e.g., FIG. 3) to a deflected position (e.g., FIGS. 5 and 6).

Figure 9:
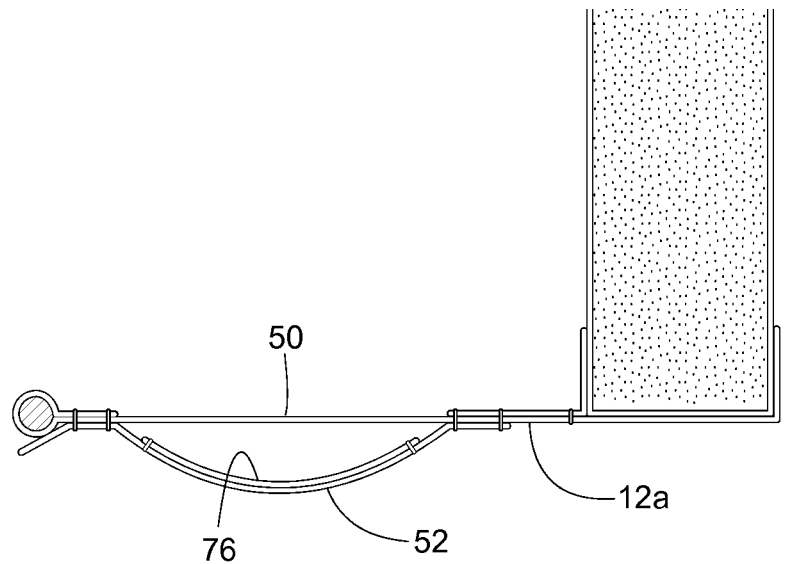
FIG. 9 is a cross-sectional view similar to FIG. 2, but showing another example seal assembly disclosed herein.

To provide blister 14 with greater stiffness or durability, an example face panel 12*a* shown in FIG. 9 includes a layer of reinforcement 76 attached to an inner of front sheet 52. Additionally or alternatively, the layer of reinforcement 76 may be attached to an outer surface of the front sheet 52. In some examples, reinforcement 76 is made of a similar material and similar thickness as front sheet 52.

Figure 10:
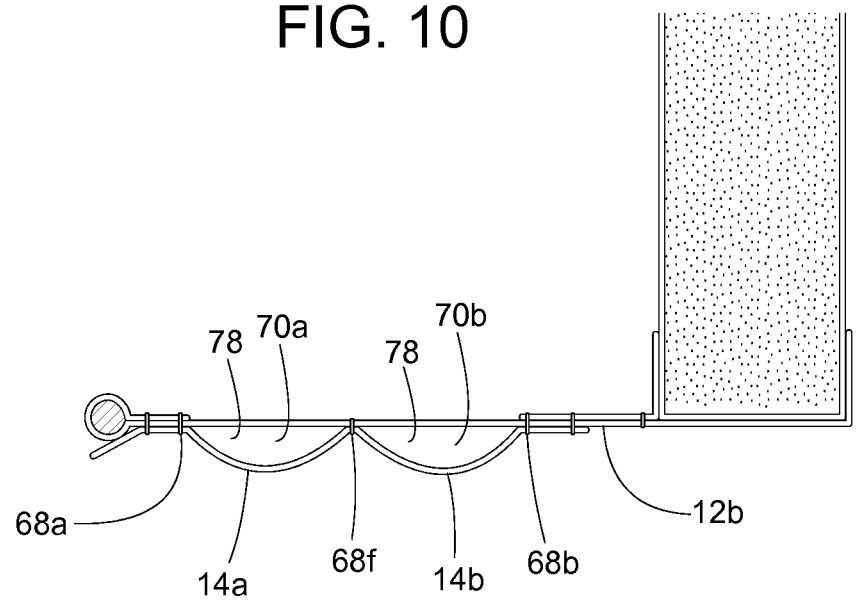
FIG. 10 is a cross-sectional view similar to FIG. 2, but showing yet another example seal assembly disclosed herein.
Figure 11:
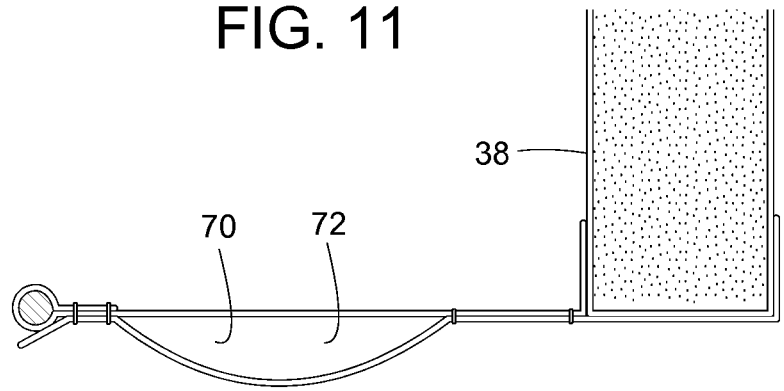
FIG. 11 is a cross-sectional view similar to FIG. 2, but showing another example seal assembly disclosed herein.
Figure 12:
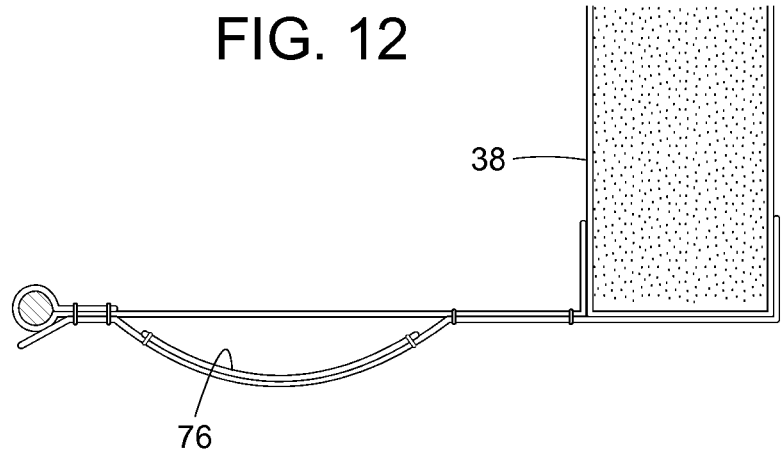
FIG. 12 is a cross-sectional view similar to FIG. 9, but showing another example seal assembly disclosed herein.
Figure 13:
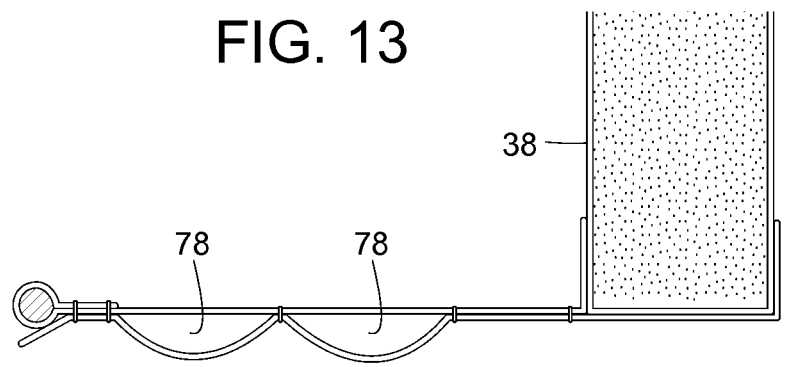
FIG. 13 is a cross-sectional view similar to FIG. 10, but showing yet another example seal assembly disclosed herein.

In some examples, as shown in FIG. 10, a face panel 12*b* includes first seam 68*a*, second seam 68*b* and a third seam 68*f* to create two blisters 14*a* and 14*b* defining two elongate chambers 70*a* and 70*b*, each of which define a variable volume of air 78. Such a multi-blister design may provide a more effective seal in some cases. Examples shown in FIGS. 11, 12 and 13 show alternate construction details of the examples shown in FIGS. 2, 9 and 10, respectively.

Figure 14:
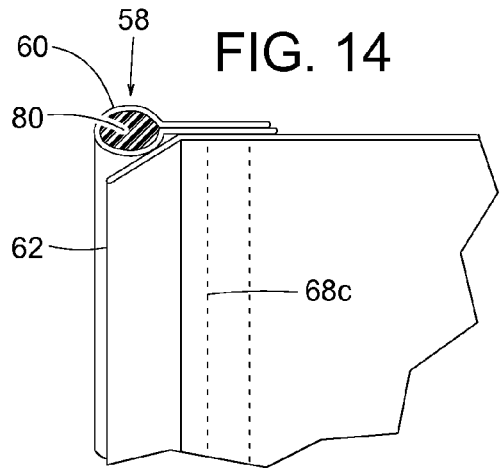
FIG. 14 is a perspective view showing a first example tip seal of the example seal assembly of FIGS. 2-7.

The example face panels (e.g., face panels 12, 12', 12*a* and 12*b*) disclosed herein may include a tip seal disposed along the face panel's distal edge (e.g., along distal edge 64). Various example tip seals are shown in FIGS. 14-22. FIG. 14 shows tip seal 58 comprising seal flap 62, elongate casing 60 in a loop form and an elongate stiffener 80 disposed within casing 60. In some examples, elongate stiffener 80 is a one-inch diameter foam cord (e.g., polyolefin foam). Example materials of casing 60 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.

Figure 15:
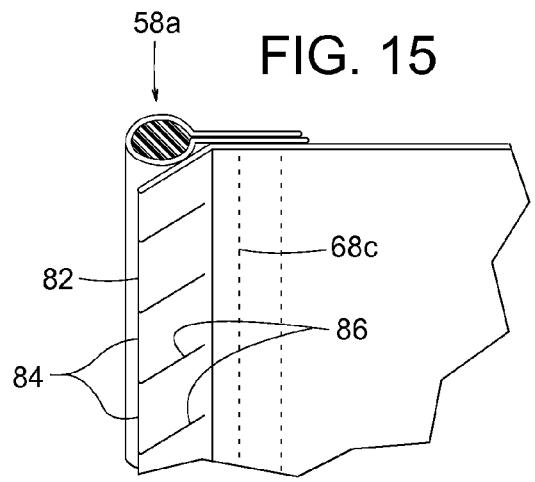
FIG. 15 is a perspective view similar to FIG. 14, but showing a second example tip seal for use with example seal assemblies disclosed herein.

A tip seal 58*a* with a seal flap 82, shown in FIG. 15, is similar to tip seal 58 of FIG. 14. However, instead of one continuous seal flap 62, seal flap 82 includes a plurality of tabs 84 and slits 86. Tabs 84 and slits 86 provide seal flap 82 with greater flexibility and freedom of movement to fit around various vehicle irregularities such as light 34 and door hardware 36 or any other surface irregularities of the rear portion 16.

Figure 16:
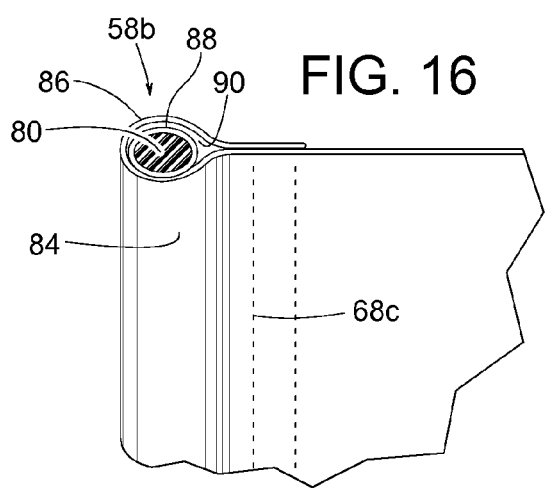
FIG. 16 is a perspective view similar to FIG. 14, but showing a third example tip seal for use with example seal assemblies disclosed herein.

Referring to FIG. 16, another example tip seal 58*b*, similar to tip seal 58, includes a seal flap 84 that is actually an integral part or portion of an outer casing 86 that encircles at least most of an inner elongate casing 88, wherein inner casing 88 contains foam cord 80. Cord 80 and inner casing 88 of FIG. 16 is similar to elongated stiffener 80 and casing 60 of FIG. 14 in that little if any radial gap exists between cord 80 and casing 88. The relatively tight radial fit between cord 80 and casing 88 provides tip seal 58*b* with some relative stiffness, shape and/or form. An appreciable radial gap 90 (e.g., about 0.1 to 0.3 inches), however, does exist between casings 86 and 88 to provide tip seal 58*b* with greater flexibility and freedom of movement than that which would otherwise be achieved if there were no radial gap 90 at that location.

Figure 17:
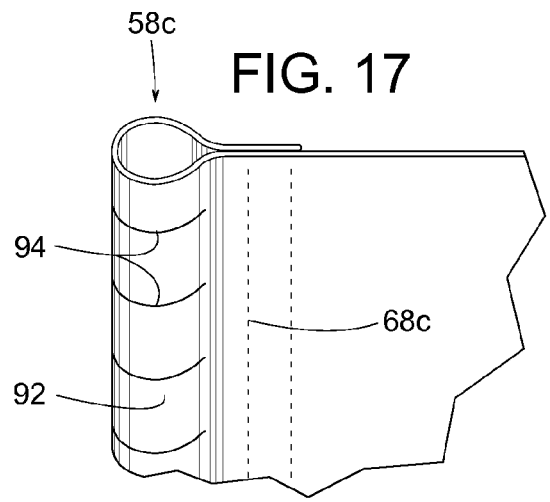
FIG. 17 is a perspective view similar to FIG. 14 but showing a fourth example tip seal for use with example seal assemblies disclosed herein.

In the example shown in FIG. 17, a tip seal 58*c* comprises a seal flap 92 in the form of a loop with no cord inside the loop. To provide tip seal 58*c* with flexibility and freedom of movement, seal flap 92 includes a plurality of slits 94.

Figure 18:
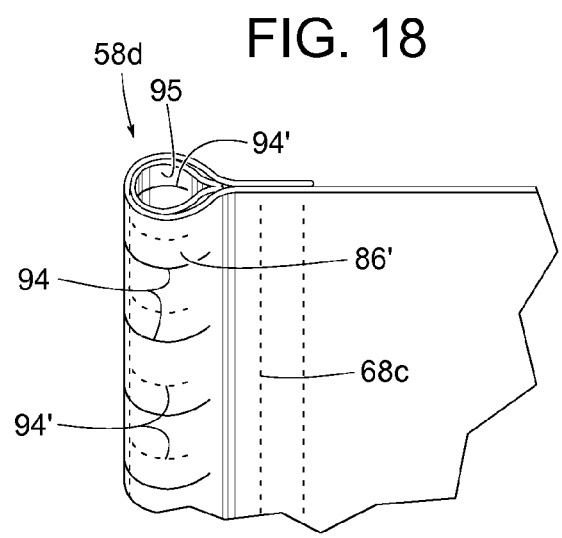
FIG. 18 is a perspective view similar to FIG. 14, but showing a fifth example tip seal for use with example seal assemblies disclosed herein.

FIG. 18 illustrates a tip seal 58*d* similar to tip seal 58*c* of FIG. 17. However, tip seal 58*d* includes an elongate stiffener 95 that is in a smaller loop form than the loop form of an outer casing 86'. Stiffener 95 has a plurality of slits 94' to provide tip seal 58*d* with flexibility and freedom of movement. Slits 94 in outer casing 86' and slits 94' in stiffener 95 are vertically staggered relative to each other to help seal off air gaps that slits 94 and 94' would otherwise create through tip seal 58*d*.

Figure 19:
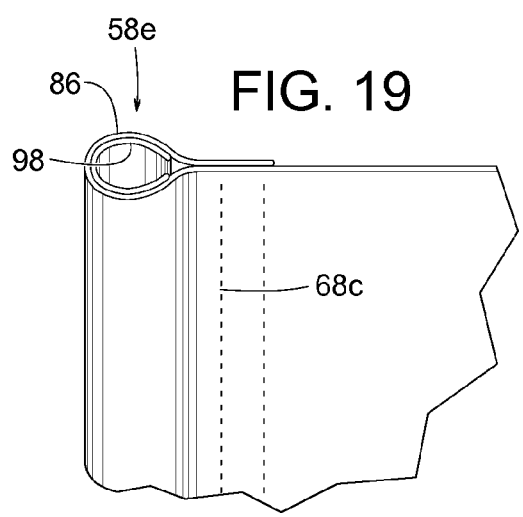
FIG. 19 is a perspective view similar to FIG. 14 but showing a sixth example tip seal for use with example seal assemblies disclosed herein.
Figure 20:
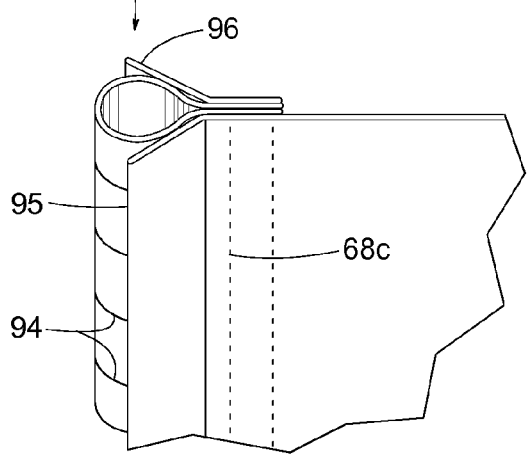
FIG. 20 is a perspective view similar to FIG. 14 but showing a seventh example tip seal for use with example seal assemblies disclosed herein.

The example shown in FIG. 19 illustrates a tip seal 58*e* similar to tip seal 58*c* of FIG. 17. However, tip seal 58*e* has no slits 94 and includes an elongate stiffener 98 that is in a smaller loop form than the loop form of outer casing 86. In the example shown in FIG. 20, a tip seal 58*f* is similar to tip seal 58*c* of FIG. 17 but with the addition of seal flaps 95 and 96.

Figure 21:
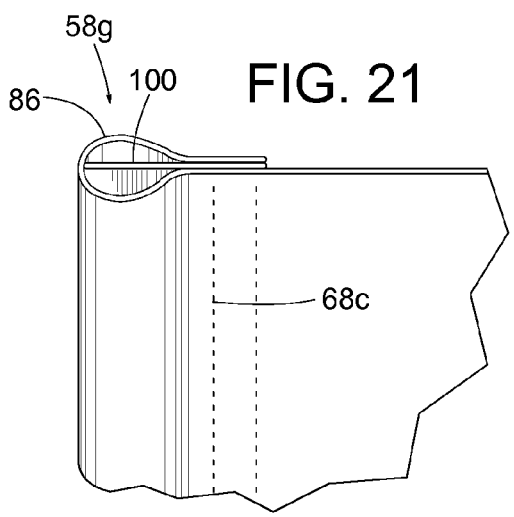
FIG. 21 is a perspective view similar to FIG. 14 but showing an eighth example tip seal for use with example seal assemblies disclosed herein.
Figure 22:
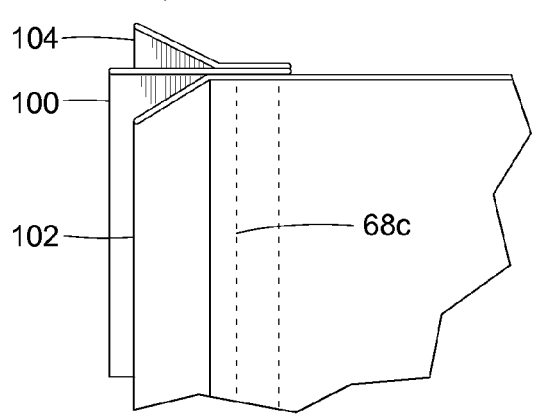
FIG. 22 is a perspective view similar to FIG. 14 but showing a ninth example tip seal for use with example seal assemblies disclosed herein.

The example shown in FIG. 21 illustrates a tip seal 58*g* similar to tip seal 58*e* of FIG. 19. However, tip seal 58*g* includes a generally planar stiffener 100 instead of the loop-style stiffener 98 of FIG. 19. In the example shown in FIG. 22, a tip seal 58*h* is similar to tip seal 58*g* of FIG. 21 in that they both include the generally planar stiffener 100. However, instead of loop-style outer casing 86, tip seal 58*h* includes two seal flaps 102 and 104.

Figure 23:
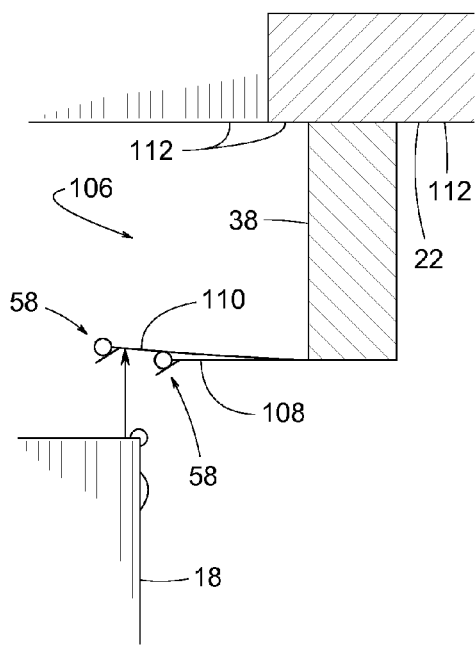
FIG. 23 is a cross-sectional view similar to FIG. 3, but showing another example seal assembly disclosed herein in a standby position just prior to moving to a first deflected position.
Figure 24:
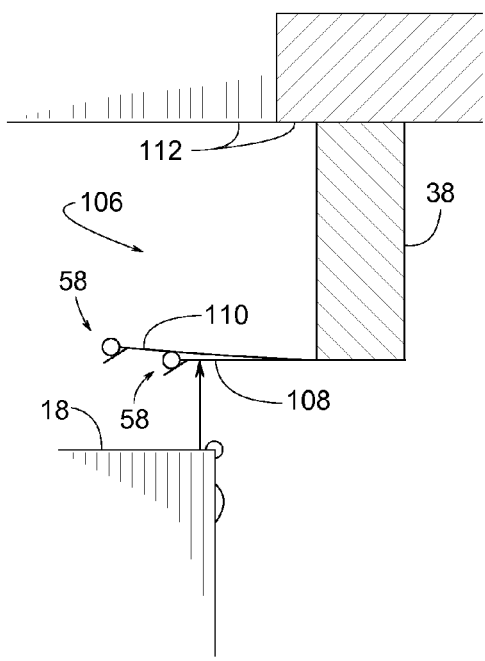
FIG. 24 is a cross-sectional view similar to FIG. 23, but showing the seal assembly of FIG. 23 just prior to moving to a second deflected position.
Figure 25:
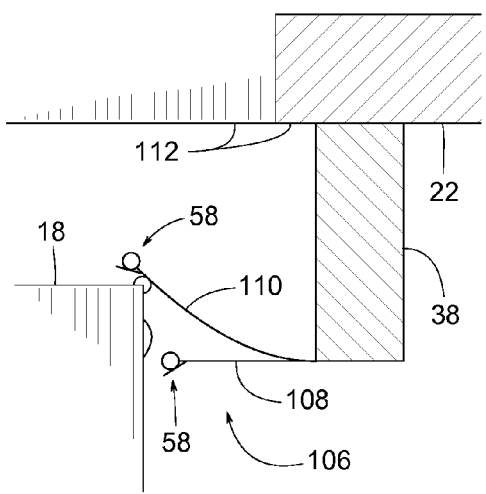
FIG. 25 is a cross-sectional view similar to FIG. 23, but showing the seal assembly in the first deflected position.
Figure 26:
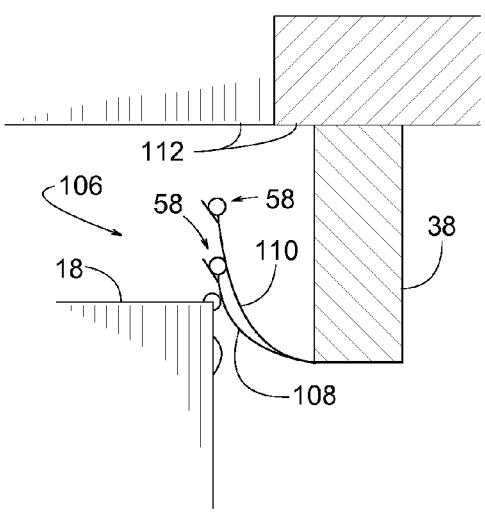
FIG. 26 is a cross-sectional view similar to FIG. 24, but showing the seal assembly in the second deflected position.

FIGS. 23-28 show another example seal assembly 106 described herein. Seal assembly 106 includes multiple overlapping face panels, e.g., a first face panel 108 and a second face panel 110. With seal assembly 106 having multiple face panels 108 and 110, vehicle 18 can deflect or move seal assembly 106 from a standby position of FIGS. 23, 24 and 27 to first and second deflected positions, as shown in FIGS. 25 and 26, respectively. FIG. 28 shows another example of a second deflected position. In the deflected position of FIG. 28, both face panels 108 and 110 sealingly engage a side surface of vehicle 18. The various positions of seal assembly 106 are with respect to projection panel 38 and an imaginary plane 112 defined by and parallel to wall 22.

Some examples of face panels 108 and 110 include a blister, such as blisters 14, 14a or 14b. In other examples, as shown in FIGS. 23-28, face panels 108 and 110 have no such blister. In any case, multiple offset face panels 108 and 110 can enhance the sealing against vehicle 18 and/or accommodate lateral misalignment between vehicle 18 and seal assembly 106. In FIG. 23 (standby position), for instance, vehicle 18 is biased away from projection panel 38, yet tip seal 58 of second face panel 110 can still engage and seal against vehicle 18, as shown in FIG. 25 (first deflected position). If vehicle 18 is biased toward projection panel 38, as shown in FIG. 24, vehicle 18 can deflect both face panels 108 and 110, as shown in FIG. 26 (second deflected position). With seal assembly 106 in the second deflected position of FIG. 26, vehicle 18 engages and sealingly contacts at least one of side panels 108 and 110, and in some cases, further seals against at least one of the two tip seals 58. Some examples of tip seals 58 include, but are not limited to, those illustrated in FIGS. 14-22.

In some examples, as shown in FIGS. 29 and 30, a seal assembly 106' includes a web 109 extending between distal edges of face panels 108 and 110. In some cases, as vehicle 18 deflects seal assembly 106' from its standby position of FIG. 29 to its deflected position of FIG. 30, web 109 enhances the sealing between vehicle 18 and seal assembly 106'.

FIGS. 31 and 32 show an example seal assembly 114 including projection panel 38, a face panel 116, and a tip seal 118. Face panel 116 includes blister 14 defining chamber 70 with the variable volume of air 72. Tip seal 118, however, is sufficiently rigid to provide a backstop that can hold a bulging portion 120 of blister 14 over a door hinge gap at the rear edge of vehicle 18. The bulging portion 120 may develop in response to vehicle 18 deflecting face panel 116 from a standby position of FIG. 31 to a deflected position of FIG. 32.

Figure 33:
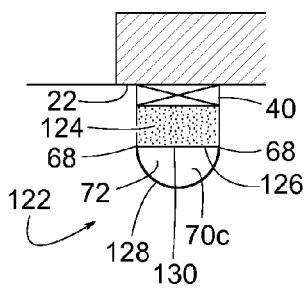
FIG. 33 is a cross-sectional top view similar to FIG. 3, but showing another example seal assembly disclosed herein.
Figure 34:
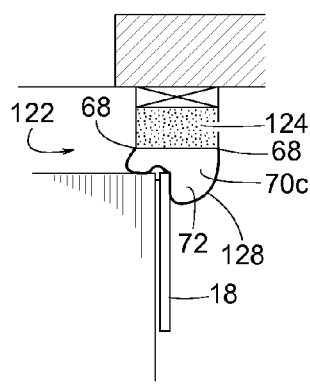
FIG. 34 is a cross-sectional top view similar to FIG. 33, but showing a vehicle backed against the example seal assembly of FIG. 33.

FIGS. 33-53 show various examples of seal assemblies with blisters, where the example seal assemblies function more as dock seals than as dock shelters. FIG. 33 shows an example seal assembly 122 in a standby position, and FIG. 34 shows seal assembly 122 in a deflected position. In this example, a seal assembly 122 comprises backer 40, a resiliently compressible foam core 124 (similar to core 42), a pliable protective cover 126 (similar to cover 44), and a front sheet 128 extending between first and second seams 68. Front sheet 128 bulges outward between the two seams 68 to create an elongate chamber 70c with a variable volume of air 72 between front sheet 128 and a portion 130 of cover 126. In the deflected position, the bulging portion 120 of the blister 14 seals along a first portion of vehicle 18 (e.g., the door hinge gap) and another portion of the blister 14 seals along a second portion of vehicle 18 (e.g., the side of the vehicle).

In the example of seal assembly 122, portion 130 of cover 126 is considered a "back sheet," and backer 40 alone and/or in combination with core 124 is considered a "projection panel" in that backer 40 and core 124 each extend outward from wall 22. A similar back sheet and/or backer construction applies to other example seal assemblies shown in FIGS. 35-53. Example materials of cover 126 and sheet 128 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc. Such example materials for covers and sheets are also used in some examples of the seal assemblies shown in FIGS. 35-53. As vehicle 18 backs into seal assembly 122, sheet 128 deforms to seal against vehicle 18, as shown in FIG. 34. If vehicle 18 backs further into seal assembly 122, core 124 can deform as well.

In some examples of seal assembly 122, elongate chamber 70c is open at one end, open at both opposite ends, and/or open at intermediate points between the opposite ends to place the volume of air 72 in open fluid communication with surrounding ambient air outside of seal assembly 122. Because chamber 70c is open at each opposite end, for example, the uppermost and lowermost ends of chamber 70c are open when chamber 70c extends substantially vertically (e.g., when seal assembly 122 is used as a side member rather than a header). Chamber 70c being open to ambient air maintains the air in chamber 70c at atmospheric pressure and thus prevents otherwise possible internal positive air pressure from hindering the flexibility or normal compliance of the blister created by bulging sheet 128. This same principle of having chamber 70c open to ambient air, and thus maintained at atmospheric pressure, can apply to other examples of seal assemblies shown in FIGS. 35-53.

Figure 35:
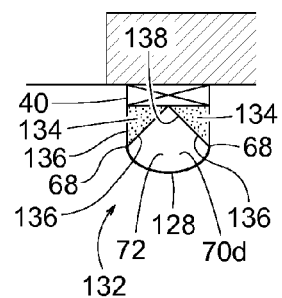
FIG. 35 is a cross-sectional top view similar to FIG. 33, but showing another example seal assembly disclosed herein.

In the example of FIG. 35, a seal assembly 132 comprises backer 40, a resiliently compressible foam core 134 in a double V-shape (single or multi-piece core), a pliable protective cover 136 (similar to cover 44), and front sheet 128 extending between first and second seams 68. The double V-shape of core 134 creates an elongate chamber 70d between cover 136 and front sheet 128 and further between the two seams 68. Elongate chamber 70d has a variable volume of air 72 between front sheet 128 and a portion 138 of cover 136. As vehicle 18 backs into seal assembly 136, core 134 is compressed and sheet 128 deforms into chamber 70d to seal against vehicle 18.

Figure 36:
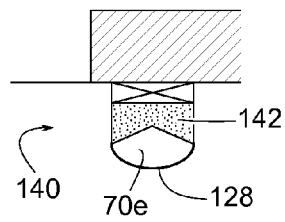
FIG. 36 is a cross-sectional top view similar to FIG. 33, but showing another example seal assembly disclosed herein.

FIG. 36 shows an example seal assembly 140 that is similar to seal assembly 132 of FIG. 35. However, seal assembly 140 has a core 142 and a chamber 70e with slightly modified shapes to provide different sealing characteristics that might be better in some situations.

Figure 37:
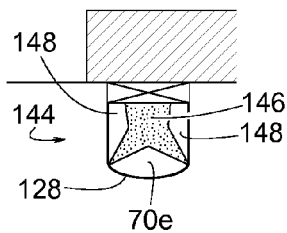
FIG. 37 is a cross-sectional top view similar to FIG. 33, but showing another example seal assembly disclosed herein.

FIG. 37 shows an example seal assembly 144 that is similar to seal assembly 140 of FIG. 36. However, seal assembly 144 has a core 146 with a modified shape to create additional air chambers 148 that might provide different (e.g., increased) sealing in some situations.

Figure 38:
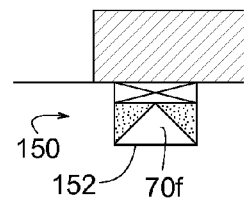
FIG. 38 is a cross-sectional top view similar to FIG. 33, but showing another example seal assembly disclosed herein.

FIG. 38 shows an example seal assembly 150 that is similar to seal assembly 132 of FIG. 35. However, seal assembly 150 has a front sheet 152 that is flatter that sheet 128 of FIG. 35. Front sheet 152 being relatively flat creates an elongate air chamber 70f that has a relatively smaller volume and/or a different cross-sectional shape for relatively better sealing in some situations.

Figure 39:
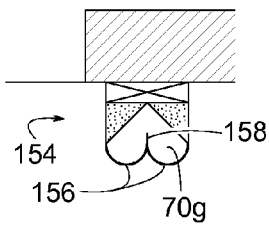
FIG. 39 is a cross-sectional top view similar to FIG. 33, but showing another example seal assembly disclosed herein.

FIG. 39 shows an example seal assembly 154 that is similar to seal assembly 132, of FIG. 35. However, seal assembly 154 has a front sheet 156 that is held pinched together at a central seam 158. Front sheet 156 being in such a shape creates an elongate air chamber 70g having a "double-bubble" cross-sectional shape for relatively better sealing in some situations. In some cases, for example, one "bubble" might seal against the rear surface or cover the door hinge area of a vehicle while the other "bubble" might seal against the vehicle's side surface.

Figure 40:
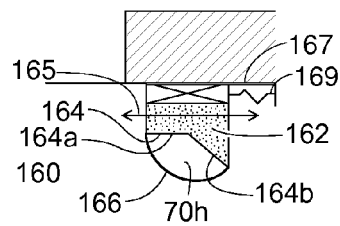
FIG. 40 is a cross-sectional top view similar to FIG. 33, but showing another example seal assembly disclosed herein.

FIG. 40 shows an example seal assembly 160 that is somewhat of a hybrid of seal assembly 122 of FIG. 33 and seal assembly 140 of FIG. 36. Seal assembly 160 has a foam core 162 with a forward facing surface 164 that is flat on one side 164a (similar to core 124) and beveled on the other side 164b (similar to core 140). A bowed front sheet 166 (similar to sheet 128) creates an elongate air chamber 70h between sheet 166 and surface 164 (e.g., surfaces 164a and 164b). Air chamber 70h has a cross-sectional shape for relatively better sealing in some situations. As an alternative to the fixed mounting of the seal assembly 10 to the wall 22, the seal assembly 10 can be mounted for horizontal shifting or sliding movement relative to the wall 22 in the direction of arrow 165. For example, a track 167 may be employed to enable shifting or movement of the seal assembly 10 relative to the wall 22 in the direction of arrow 165. Further, a biasing element 169 may be employed bias or urge the seal assembly 10 towards the doorway 24 in a direction along arrow 165.

Figure 41:
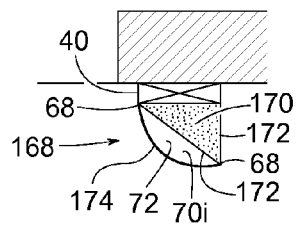
FIG. 41 is a cross-sectional top view similar to FIG. 33, but showing another example seal assembly disclosed herein.
Figure 42:
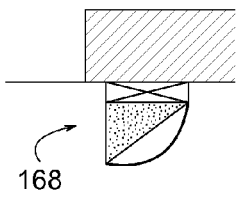
FIG. 42 is a cross-sectional top view similar to FIG. 33, but showing another example seal assembly disclosed herein.

FIG. 41 shows an example seal assembly 168 comprising backer 40, a resiliently compressible foam core 170 (similar to core 42 but in a triangular shape), a pliable protective cover 172 (similar to cover 44), and a front sheet 174 extending between first and second seams 68. Front sheet 174 bulges outward between the two seams 68 to create an elongate chamber 70i with a variable volume of air 72. FIG. 42 shows seal assembly 168 in a different orientation. In either position, as vehicle 18 backs into seal assembly 168, core 170 is compressed and sheet 174 deforms into chamber 70i to seal against vehicle 18.

Figure 43:
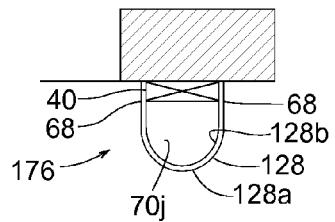
FIG. 43 is a cross-sectional top view similar to FIG. 33, but showing another example seal assembly disclosed herein.

FIG. 43 shows an example seal assembly 176 similar to seal assembly 122 of FIG. 33. Instead of core 124, however, seal assembly 176 achieves structural support and resilience by having two layers 128a and 128b of front sheet 128. A similar double-layer design is shown in FIG. 9. Front sheet 128, comprising layers 128a and 128b, bulges outward between two seams 68 to create an elongate chamber 70j with variable volume of air 72. Omitting core 124 reduces costs and eliminates the need for protecting such a core from moisture and wear.

Figure 44:
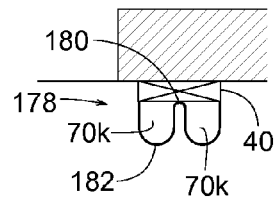
FIG. 44 is a cross-sectional top view similar to FIG. 33, but showing another example seal assembly disclosed herein.

FIG. 44 shows an example seal assembly 178 similar to seal assembly 154 of FIG. 39. With seal assembly 178, however, the foam core is omitted and a seam 180 connects a central region of a front sheet 182 to backer 40 to create two elongate chambers 70k each with variable air volume 72. Omitting the foam core and having two chambers 70k provide advantages found in seal assembly 154 of FIG. 39 and seal assembly 176 of FIG. 43.

FIGS. 45 and 46 show an example seal assembly 184 similar to seal assembly 168 of FIG. 41, but with an added shield 186. FIG. 45 shows seal assembly 184 in a standby position, and FIG. 46 shows seal assembly 184 in a deflected position. In the illustrated example, seal assembly 184 comprises backer 40, foam core 170, protective cover 172 overlying core 170, a front sheet 188 and shield 186. Front sheet 188 bows outward from core 170 and extends between two seams 68f and 68g with an intermediate seam 68h therebetween. Seam 68h couples or connects front sheet 188 to an intermediate point on shield 186. Sheet 188 bulges outward to create an elongate chamber 70m with air volume 72. As vehicle 18 backs into seal assembly 184 as shown in FIG. 46, sheet 188 deforms to seal against vehicle 18. As sheet 188 deforms, movement of the sheet 188 draws shield 186 toward an interior surface 190 of vehicle 18, whereby shield 186 and sheet 188 cover and seal the air gap at the vehicle's door hinge 192.

To provide seal assembly 184 with greater resilience to ensure seal assembly 184 returns to a standby position (e.g., a non-deflected position) after vehicle 18 departs, a stiffener 194 is added to seal assembly 184 to urge shield 186 to return the position shown in FIG. 47. Stiffener 194 is schematically illustrated to represent any structure that can urge shield 186 to the standby position of FIG. 47. Examples of stiffener 194 include, but are not limited to, a resilient piece of polymeric material (e.g., fiberglass, polyurethane, foam, rubber, etc.), spring steel, a torsion spring, etc.

FIG. 48 shows an example seal assembly 196 that is similar to seal assembly 176 of FIG. 43, but includes shield 186 and a web 198. Seal assembly 196 includes backer 40, front sheet 128, shield 186, and web 198. The web 198 extends from shield 186 to front sheet 128. Front sheet 128 extends between two seams 68 and bows outward from backer 40 to create chamber 70j. As vehicle 18 backs into seal assembly 196, front sheet 128 sealingly conforms to the contour of vehicle 18, web 198 wraps across the air gap at the vehicle's door hinge 192, and shield 186 gets pulled against the vehicle's interior surface 190 in a manner similar to that shown in FIG. 46.

In another example, shown in FIGS. 49-51, a seal assembly 200 comprises backer 40, an L-shaped resilient foam core 202, a protective cover 204 encasing core 202, and a front sheet 206. Front sheet 206 extends between two seams 68 and bulges forward to create an elongate chamber 70n with variable volume of air 72. FIG. 49 shows seal assembly 200 in a standby position, FIG. 50 shows assembly 200 in a first deflected position, and FIG. 51 shows assembly 200 in another deflected position. In the first deflected position shown in FIG. 50, front sheet 206 seals against a side surface 208 of vehicle 18. In the illustrated example, side surface 208 is the interior surface of the vehicle's open rear door 210. In the second deflected position, shown in FIG. 51, front sheet 206 deforms to seal against side surface 208 and cover the air gap at the vehicle's door hinge 192.

FIGS. 52 and 53 show an example seal assembly 212 that is an example or partial hybrid of seal assembly 168 of FIG. 41 and seal assembly 10 of FIGS. 3-6. Seal assembly 212 comprises backer 40, foam core 170, cover 172 and a face panel 214. Face panel 214, in some examples, includes a front sheet 216, a back sheet 218 and tip seal 58. Front sheet 216 extends between two seams 68 and bulges away from back sheet 218 to create an elongate chamber 70p with variable volume of air 72. When vehicle 18 backs into seal assembly 212, face panel 216 compliantly seals against vehicle 18 in a manner similar to face panel 28 of FIGS. 3-6 and core 170 deforms or otherwise reacts in a manner similar to core 170 of FIG. 41. In some examples, a stiffener 218 is provided to seal assembly 212 to urge face panel 216 to the position shown in FIGS. 52 and 53 (e.g., a standby position or non-deflected position). Stiffener 218 is schematically illustrated to represent any structure that can urge face panel 216 to the position of FIGS. 52 and 53. Examples of stiffener 218 include, but are not limited to, a resilient piece of polymeric material (e.g., fiberglass, polyurethane, foam, rubber, etc.), spring steel, a torsion spring, etc.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A seal system for sealing against a vehicle at a loading dock, wherein the loading dock includes a wall with a doorway, the seal assembly comprising:
   a projection panel mountable to extend outward from the wall in proximity with the doorway;
   a face panel to be coupled to the projection panel, the face panel being substantially perpendicular to the projection panel when the face panel is coupled to the projection panel, the face panel having a front sheet, a back sheet and a distal edge, the front sheet to adjoin the back sheet, the distal edge spaced apart from the projection panel, the distal edge being elongate along a primary length of the face panel, the face panel to extend from the projection panel in front of the doorway when the projection panel is mounted to the wall, the face panel spaced apart from the wall, the face panel movable between a standby position and a deflected position relative to the projection panel, the back sheet to face the doorway when the projection panel is mounted to the wall and the face panel is in the standby position, the front sheet to face away from the doorway when the projection panel is mounted to the wall and the face panel is in the standby position, the face panel to be positioned closer to the wall when the face panel is in the deflected position than when the face panel is in the standby position; and a first seam and a second seam to be positioned where the front sheet adjoins the back sheet, having relatively more sheet material between the first seam and the second seam than sheet material of the back sheet between the first seam and the second seam to enable the front sheet to bulge away from the back sheet between the first seam and the second seam to create a blister defining an elongate chamber, the elongate chamber to contain a variable volume of air between the front sheet and the back sheet, the face panel to move from the standby position to the deflected position in reaction to the vehicle engaging the front sheet upon the vehicle approaching the doorway.

2. The seal system of claim 1, further comprising a tip seal to extend along the distal edge of the face panel, the tip seal being in a loop form to provide an elongate casing.

3. The seal system of claim 2, further comprising a foam cord to be disposed within the elongate casing.

4. The seal system of claim 2, further comprising a seal flap to be disposed along the distal edge of the face panel, the elongate casing to be interposed between the seal flap and the doorway when the face panel is in the standby position.

5. The seal system of claim 1, wherein at least one of the first seam or the second seam includes a string of thread.

6. The seal system of claim 1, a third seam to connect the front sheet to the back sheet, the front sheet to bulge away from the back sheet between the second seam and the third seam to form a second blister to define a second elongate chamber to contain a second variable volume of air between the front sheet and the back sheet.

7. The seal system of claim 1, wherein the elongate chamber is open at opposite ends thereof to place the variable volume of air in open fluid communication with ambient air.

8. The seal system of claim 1, further comprising a resiliently compressible foam to be disposed within the elongate chamber.

9. The seal system of claim 1, wherein the projection panel includes a resiliently compressible foam core.

10. The seal system of claim 1, wherein at least one of the first seam or the second seam is to connect the front sheet to the back sheet.

11. The seal system of claim 1, wherein the variable volume of air is to shift between the first and second seams in reaction to the face panel moving between the standby position and the deflected position.

12. The seal system of claim 1, wherein the blister is to conform to seal against a hinge door gap of a vehicle and a side surface of the vehicle adjacent the hinge door gap.

13. A seal system for sealing against a vehicle at a loading dock, wherein the loading dock includes a wall with a doorway, the seal assembly comprising:

a projection panel mountable to extend outward from the wall in proximity with the doorway;

a face panel to be coupled to the projection panel, the face panel being substantially perpendicular relative to the projection panel when the face panel is attached to the projection panel, the face panel having a front sheet, a back sheet and a distal edge, the front sheet to adjoin the back sheet, the distal edge spaced apart from the projection panel, the distal edge being elongate along a primary length of the face panel, the face panel to extend from the projection panel in front of the doorway when the projection panel is mounted to the wall, the face panel spaced apart from the wall, the face panel movable between a standby position and a deflected position relative to the projection panel, the back sheet to face the doorway when the projection panel is mounted to the wall and the face panel is in the standby position, the front sheet to face away from the doorway when the projection panel is mounted to the wall and the face panel is in the standby position, the face panel to be positioned closer to the wall when the face panel is in the deflected position than when the face panel is in the standby position; and a first seam and a second seam to be positioned where the front sheet adjoins the back sheet, wherein the front sheet is to be curved and the back sheet is to be substantially planar to enable the front sheet to bulge away from the back sheet between the first seam and the second seam to create a blister defining an elongate chamber, the elongate chamber to contain a variable volume of air between the front sheet and the back sheet, the face panel to move from the standby position to the deflected position in reaction to the vehicle engaging the front sheet upon the vehicle approaching the doorway.

14. A seal assembly for sealing against a vehicle at a loading dock, wherein the loading dock includes a wall with a doorway, the seal assembly comprising:

a projection panel mountable to extend outward from the wall in proximity with the doorway; and a face panel connected to the projection panel at a point of attachment, the face panel having a front sheet, a plurality of stays and a distal edge, the distal edge being spaced apart from the projection panel, the distal edge being elongate along a primary length of the face panel, each of the plurality of stays being elongate to extend from the point of attachment toward the distal edge, the face panel to extend from the projection panel in front of the doorway when the projection panel is mounted to the wall, the face panel being spaced apart from the wall, the face panel being movable between a standby position and a deflected position relative to the projection panel, the plurality of stays to face the doorway when the projection panel is mounted to the wall and the face panel is in the standby position, the front sheet facing away from the doorway when the projection panel is mounted to the wall and the face panel is in the standby position, the face panel being closer to the wall when the face panel is in the deflected position than when the face panel is in the standby position, the front sheet bowing away from the plurality of stays to form a blister containing a variable volume of air between the front sheet and the plurality of stays when the face panel is in the standby position, the face panel to move from the standby position to the deflected position in reaction to the vehicle engaging the front sheet upon the vehicle approaching the doorway.

15. The seal system of claim 14, wherein at least a portion of the variable volume of air contained in the blister to shift between the distal edge and the point of attachment when the face panel moves between the standby position and the deflected position.

16. A seal system for sealing against a vehicle at a loading dock, wherein the loading dock includes a wall with a doorway, the seal assembly comprising:
a projection panel mountable to extend outward from the wall in proximity with a lateral edge of the doorway, the projection panel being vertically elongate when the projection panel is mounted to the wall;
a face panel to couple to the projection panel, the face panel being substantially perpendicular and vertically elongate relative to the projection panel when the face panel is attached to the projection panel and the projection panel is mounted to the wall, the face panel comprising a front sheet, a back sheet and a distal edge, the distal edge being spaced apart from the projection panel, the distal edge being vertically elongate when the projection panel is mounted to the wall, the face panel to extend from the projection panel in front of the doorway when the projection panel is mounted to the wall, the face panel to move between a standby position and a deflected position relative to the projection panel, the back sheet to face the doorway and the front sheet to face away from the doorway when the projection panel is mounted to the wall and the face panel is in the standby position, the face panel positioned closer to the wall when the face panel is in the deflected position than when the face panel is in the standby position, the face panel to move from the standby position to the deflected position in reaction to the vehicle engaging the front sheet; and
a first seam adjacent a second seam to connect the front sheet to the back sheet, the front sheet in an area between the first and second seams being materially wider than the back sheet between the first and second seams so that the front sheet bulges away from the back sheet between the first seam and the second seam to form a blister engageable by a vehicle, the blister defining a vertically elongate chamber that is deformable to contain a variable volume of air between the front sheet and the back sheet, the elongate chamber having a first opening at an upper end of the chamber and a second opening a lower end of the chamber to place the variable volume of air in open fluid communication with ambient air.

17. The seal system of claim 16, wherein at least one of the first seam or the second seam includes a thread.

18. The seal system of claim 16, wherein the variable volume of air is to shift from one of the first seam or the second seam toward the other one of the first seam or the second seam in reaction to the face panel moving between the standby position and the deflected position.

19. The seal system of claim 16, wherein the blister is to seal against a hinge door gap of a vehicle and a side surface of the vehicle adjacent the hinge door gap.

20. A seal system for sealing against a vehicle at a loading dock, wherein the loading dock includes a wall with a doorway, the seal assembly comprising:
a projection panel mountable to extend outward from the wall in proximity with the doorway;
a face panel connected to the projection panel, the face panel having a distal edge, the distal edge being spaced apart from the projection panel, the distal edge being elongate along a primary length of the face panel, the face panel to extend from the projection panel in front of the doorway when the projection panel is mounted to the wall and is to move between a standby position and a deflected position relative to the projection panel, the face panel being closer to the wall when the face panel is in the deflected position than when the face panel is in the standby position, the face panel to move from the standby position to the deflected position in reaction to the vehicle engaging a front sheet of the face panel upon the vehicle approaching the doorway; and
a tip seal extending along the distal edge of the face panel, the tip seal having a foam cord, an elongate casing and a seal flap, the elongate casing being in a loop form, the foam cord being disposed within the elongate casing, the foam cord and the elongate casing being interposed between at least a portion of the seal flap and the doorway when the face panel is in the standby position, the seal flap is a strip of material configured to deform to fit around an irregularity of a vehicle when the vehicle engages the seal flap, the seal flap being coupled to the face panel such that the foam cord is to deflect an edge of the seal flap in a direction away from the front sheet of the face panel when the face panel is in a standby position.

21. The seal system of claim 20, wherein the seal flap comprises a plurality of tabs.

22. The seal assembly of claim 21, wherein the plurality of tabs defines a plurality of slits therebetween, the plurality of slits extending in a horizontal direction.

23. The seal assembly of claim 21, wherein the seal flap is part of an outer casing surrounding most of the elongate casing and the foam cord, the elongate casing and the outer casing defining a radial gap therebetween.

24. A seal system for sealing against a vehicle at a loading dock, wherein the loading dock includes a wall with a doorway, the seal assembly comprising:
a projection panel mountable to extend outward from the wall in proximity with the doorway;
a face panel being substantially perpendicular relative to the projection panel when the face panel is coupled to the projection panel, the face panel spaced apart from the wall and movable between a standby position and a deflected position relative to the projection panel, the face panel having a first sheet coupled to a second sheet via at least a first fastener and a second fastener, the first sheet to be engaged by a vehicle when the face panel moves between the standby position and the deflected position, the first sheet in an area between the first and second fasteners to bulge away from the second sheet to form a deformable blister between the first and second fasteners.

25. The seal system of claim 24, further comprising a tip seal to extend along a distal end of the face panel, the tip seal having an elongate casing and an elongate stiffener, the elongate casing configured in a loop form to enable the elongate stiffener to be disposed in the elongate casing.

26. The seal system of claim 25, wherein the elongate stiffener is substantially planar.

27. The seal system of claim 25, wherein the elongate stiffener is in a smaller loop form than the loop form of the elongate casing.

28. The seal system of claim 24, wherein the blister is configured to distort between the first and second fasteners as the face panel moves between the standby position and the deflected position.

29. The seal system of claim 24, wherein the face panel is to move to the deflected position when the vehicle engages the face panel and the face panel is to move to the standby position when the vehicle is not in engagement with the face panel.

30. The seal system of claim 24, wherein the blister defines a chamber containing a volume of fluid.

* * * * *